July 4, 1939.  J. G. NADLER, JR  2,164,750
DRAWING AND EXTRUSION DIE
Filed Aug. 21, 1937
Fig: 1,
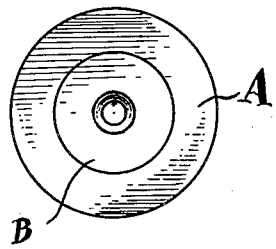
Fig: 2.
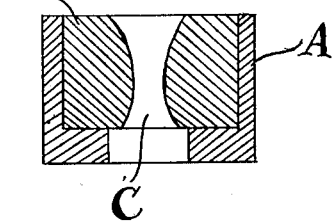
Inventor
Joseph G. Nadler Jr.

Patented July 4, 1939

2,164,750

UNITED STATES PATENT OFFICE 2,164,750

DRAWING AND EXTRUSION DIE

Joseph G. Nadler, Jr., Jersey City, N. J.

Application August 21, 1937, Serial No. 160,289

11 Claims. (Cl. 205—29)

The improvement relates to improvements in dies for drawing metal wires and extruding metals and plastics.

Various substances are presently used for such purposes, such as diamonds, sapphires, agates, and metal products generally known as tungsten carbides. Although such substances are satisfactory, dies made of them are relatively expensive and in many instances difficult to produce.

There are inexpensive, hard, wear resisting substances, herein referred to as refractories, that, due to their relative hardness are suitable for the manufacture of drawing and extrusion dies, these substances have not been in general use for die making.

It is therefore the object and novelty of this invention to make dies of such inexpensive substances by a simple process of die manufacture. The novelty of the invention is in both, the product and the process.

In the accompanying drawing, Fig. 1 represents in top plan view a wire drawing or extrusion die, Fig. 2 is a vertical cross section of Fig. 1.

Similar letters indicate like parts in both figures.

In the drawing, A indicates a metallic mantle, B indicates a thermoplastic die slab in central position in the metallic mantle, said slab comprising a thermally matured mixture of refractory and vitreous material, C indicates a vertically bored, highly polished aperture in the centre of the slab, said aperture being the wear resisting surface of the die.

The invention makes use of such refractories as: silicon carbide, corundum, garnet, emery, tripoli, and similar natural or synthetic refractories. It does not limit itself to any specific refractory.

It makes use of such substances in powdered form mixed with a suitable vitreous material capable of withstanding the actions of nitric and hydrochloric acids.

Although not limiting itself to a specific refractory, for obvious reasons it gives preference to the hardest available refractories. It prefers the use of silicon carbide and aluminum oxide, also known as corundum, either individually or in combination. All substances used for the die slab are generally non-metallic in nature.

The vitreous material used in conjunction with the refractories is preferably powdered glass. Other vitrescent materials can be used for binding such refractories into suitable die slabs. Compounds of kaolin, feldspar and silex can be used or ordinary ball clay can also be employed.

The words "vitreous" and "glass" used herein connote such substances that are generally known to be solvent in hydrofluoric acid ($H_2F_2$) and not solvent in nitric acid ($HNO_3$) or hydrochloric acid (HCl). Borax glass and similar vitreous products derived from the sodiums and potassiums alone, are excluded because they are solvent in $HNO_3$ and HCl.

The method of obtaining the product of this invention can be divided into three steps, namely;

(1) Thoroughly and evenly mixing together, in equal quantities by volume, powdered refractory, or combination of refractories with glass or some similar vitrescent substance, (2) Placing the pulverous mixture into molds.

(3) Heating the molds under vertically downward pressure to a temperature of approximately 2000 degrees Fahrenheit, thereby maturing the therein contained mixture.

The powdered mixture used, generally comprises 50% refractory and 50% glass by volume. To obtain a very hard, wear resisting die slab, 50% silicon carbide and 50% powdered glass is used and preferred. The refractories may be combined, however the bulk of refractory substance should not exceed 50% of the entire mixture by volume.

Metal molds or mantles, (indicated by A in the drawing), are preferably used and are permitted to remain around the slab, this produces an incased slab. Such slabs can be produced without casings by using molds that can be broken away after maturing and cooling the mixture.

Upon properly mixing the herein mentioned refractories either individually or in combination with glass and maturing it by heat in a casing under vertically downward pressure, an encased, hard, wear resisting die slab is obtained which is thermoplastic in nature and is composed of a uniform suspension of refractories in glass.

The thermo-plastic nature of the material is not present with the compounds of kaolin, feldspar and silex or with ball clay, once the slab is made it remains as is.

After thermally maturing and cooling the mixture in the metal mold or mantle the resultant die slab is ready for the drilling of the aperture, (indicated by C in the drawing). After drilling, the aperture is given a highly polished surface; after this procedure it is then a finished drawing or extrusion die with a centrally located aperture the wear resisting surface of which is the herein mentioned mixture of refractory and vitreous materials.

The drilling of the aperture is done by the identical method employed for drilling diamonds or tungsten carbide dies and is well known to those skilled in the art of die making.

It is obvious that due to the fact that the aperture in a drawing or extrusion die must have a highly polished surface, a material must be used that is capable of acquiring the required finish. Die slabs made with the herein mentioned materials and in accordance with the process outlined are capable of acquiring the necessary finish in the aperture.

Having thus described my invention, I claim as new and useful and desire to secure by Letters Patent—

1. In a drawing or extrusion die, a hard thermoplastic die slab composed of a uniform suspension of refractories in glass.

2. In a drawing or extrusion die, a hard thermoplastic die slab composed of a uniform suspension of refractories in glass wherein the refractories constitute no more than 50% of the slab by volume.

3. In a drawing or extrusion die, a hard thermoplastic die slab composed of a uniform suspension of either silicon carbide, aluminum oxide, garnet, emery, tripoli in glass wherein the glass constitutes no more than 50% of the slab by volume.

4. A die for drawing and extruding metals and plastics, having in combination, a hard circular thermoplast slab composed of a solidified suspension of refractories in glass, a protective outer casing and a longitudinally bored aperture centrally located in said slab.

5. A die for drawing and extruding metals and plastics, having in combination, a hard circular thermoplastic slab composed of a solidified suspension of silicon carbide in glass, a protective outer casing and a longitudinally bored aperture centrally located in said slab.

6. A die for drawing and extruding metals and plastics, having in combination, a hard circular thermoplastic slab composed of equal volumetric portions of silicon carbide and glass in a solidified uniform suspension, a protective outer casing and a longitudinally bored aperture centrally located in said slab.

7. A die for drawing and extruding metals or plastics having a centrally located longitudinal aperture, the wear resisting surface of the aperture being composed of refractories uniformly suspended in a hard vitreous binder.

8. A die for drawing and extruding metals or plastics having a longitudinally bored aperture with a hard, wear resisting thermoplastic surface, said surface of the aperture containing not more than 50%, by volume, of refractory materials.

9. A die for drawing and extruding metals or plastics having a longitudinally bored aperture with a hard, wear resisting thermoplastic surface, said surface of the aperture containing not more than 50% of a hard vitreous binder by volume.

10. A die for drawing and extruding metals or plastics having a longitudinally bored aperture with a hard, wear resisting thermoplastic surface, said surface of the aperture being composed of refractory materials uniformly suspended in glass, either of said comprising substances being not more than 50% of said aperture surface by volume.

11. A die for drawing and extruding metals or plastics having a longitudinally bored aperture with a hard, wear resisting thermoplastic surface, said surface being composed of a uniform suspension of silicon carbide, corundum, emery, garnet, tripoli, etc. in glass either individually or in combination with each other, the aforementioned refractory materials whether singly or in combination to comprise not more than 50% of said aperture surface by volume.

JOSEPH G. NADLER, Jr.